US011338901B2

(12) United States Patent
Loebig

(10) Patent No.: US 11,338,901 B2
(45) Date of Patent: May 24, 2022

(54) NACELLE FOR A BOUNDARY LAYER INGESTION PROPULSOR

(71) Applicant: Rolls-Royce Corporation, Indianapolis, IN (US)

(72) Inventor: James Loebig, Greenwood, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 543 days.

(21) Appl. No.: 16/396,006

(22) Filed: Apr. 26, 2019

(65) Prior Publication Data
US 2020/0339241 A1 Oct. 29, 2020

(51) Int. Cl.
*B64C 1/16* (2006.01)
*B64C 1/00* (2006.01)
*B64D 29/04* (2006.01)
*B64D 27/14* (2006.01)
*B64D 35/02* (2006.01)
*F01D 15/10* (2006.01)
*B64D 31/00* (2006.01)

(52) U.S. Cl.
CPC .............. *B64C 1/16* (2013.01); *B64C 1/0009* (2013.01); *B64D 27/14* (2013.01); *B64D 29/04* (2013.01); *B64D 31/00* (2013.01); *B64D 35/02* (2013.01); *F01D 15/10* (2013.01); *F05D 2220/323* (2013.01); *F05D 2220/76* (2013.01)

(58) Field of Classification Search
CPC ......... B64C 1/0009; B64C 1/16; B64C 21/02; B64C 21/06; B64D 2027/026; B64D 29/04; B64D 27/24
See application file for complete search history.

(56) References Cited

U.S. PATENT DOCUMENTS

| 9,611,034 | B1 | 4/2017 | Suciu et al. | |
| 2017/0081036 | A1 | 3/2017 | Marrinan et al. | |
| 2017/0297727 | A1* | 10/2017 | Niergarth | B64D 27/18 |
| 2018/0086438 | A1* | 3/2018 | Pastouchenko | B64C 5/02 |
| 2018/0093776 | A1 | 4/2018 | Ramakrishnan et al. | |
| 2018/0155045 | A1 | 6/2018 | Suciu et al. | |

FOREIGN PATENT DOCUMENTS

| CN | 108263620 A | * | 7/2018 |
| EP | 3048042 A1 | | 7/2016 |
| EP | 3333403 A1 | | 6/2018 |
| GB | 2544218 A | | 3/2017 |

* cited by examiner

*Primary Examiner* — Timothy D Collins
*Assistant Examiner* — Justin Michael Heston
(74) *Attorney, Agent, or Firm* — Barnes & Thornburg LLP

(57) ABSTRACT

An aircraft is disclosed having a boundary layer ingestion propulsor. The aircraft comprises an elongated fuselage extending between a nose section and a tail section. The fuselage has an upswept underside in the tail section. The boundary layer ingestion propulsor is positioned in the tail section. The propulsor comprises a fan radially encased by a nacelle circumscribing the fuselage. The nacelle defines a leading edge line extending from a top dead center to a bottom dead center of the nacelle intersecting an axis of rotation of the fan at an angle no greater than seventy degrees.

18 Claims, 5 Drawing Sheets

NACELLE FOR A BOUNDARY LAYER INGESTION PROPULSOR

BACKGROUND

A boundary layer ingestion propulsor uses low momentum air of the boundary layer of an aircraft wing or fuselage as inlet air for the propulsor. The propulsor may be, for example, a fan or engine. Air of the boundary layer has a lower momentum than free stream air that is typically ingested by gas turbine engines used to power aircraft. By ingesting the lower momentum boundary layer air, a propulsor is able to more efficiently produce thrust. The estimated efficiency gains from boundary layer propulsors are between 1% and 12% as compared to typical free stream gas turbine engines. However, positioning a boundary layer ingestion propulsor along the wing or fuselage of an aircraft has proven challenging. The inlet to the boundary layer ingestion propulsor must effectively and efficiently ingest the boundary layer air in order to achieve efficiency gains in the propulsor.

SUMMARY

According to some aspects of the present disclosure, an aircraft comprises an elongated fuselage and a boundary layer ingestion propulsor. The elongated fuselage extends between a nose section and a tail section of the aircraft. The fuselage has an upswept underside in the tail section. The boundary layer ingestion propulsor is positioned in the tail section and comprises a fan radially encased by a nacelle circumscribing the fuselage. The nacelle defines a leading edge line extending from a top dead center to a bottom dead center of the nacelle intersecting an axis of rotation of the fan at an angle no greater than seventy degrees.

In some embodiments the leading edge line intersects the axis of rotation at an angle of no greater than sixty degrees. In some embodiments the bottom dead center is positioned forward of the top dead center along the axis of rotation at an axial distance greater than a shortest distance from the top dead center to the axis of rotation.

In some embodiments the aircraft further comprises a gas turbine engine mounted to the aircraft; and an electric motor driven by the gas turbine engine, wherein the propulsor is an electric fan powered by the electric motor. In some embodiments the nacelle defines a chamber, and wherein the electric motor is positioned in the chamber. In some embodiments the electric motor is coupled to the propulsor via a shaft and a gearbox.

In some embodiments a leading edge of the nacelle extends 360 degrees about the axis of rotation and intersects the top dead center and the bottom dead center. In some embodiments a tail strike limit of the aircraft is defined as a plane tangential to the upswept underside of the tail section, and wherein the nacelle is positioned entirely within the tail strike limit.

According to further aspects of the present disclosure, an aircraft comprises an elongated fuselage and a boundary layer ingestion propulsor. The elongated fuselage extends between a nose section and a tail section of the aircraft. The fuselage has an upswept underside in the tail section. The boundary layer ingestion propulsor is positioned in the tail section and comprises a fan radially encased by a nacelle circumscribing the fuselage. The fan defines an axis of rotation and the nacelle defines a leading edge line extending from a top dead center to a bottom dead center of the nacelle. The bottom dead center is positioned forward of the top dead center along the axis of rotation at an axial distance greater than a shortest distance from the top dead center to the axis of rotation.

In some embodiments the bottom dead center is positioned forward of the top dead center along the axis of rotation at an axial distance greater than 120% of the shortest distance from the top dead center to the axis of rotation. In some embodiments an inlet duct is formed between the nacelle and the fuselage, the inlet duct being substantially asymmetrical between a top half and a bottom half of the inlet duct. In some embodiments the aircraft further comprises a pair of struts positioned in the bottom half of the inlet duct. In some embodiments the aircraft further comprises a plurality of inlet members positioned about a circumference of the inlet duct. In some embodiments a portion of the plurality of inlet members are struts. In some embodiments one or more of the plurality of inlet members is shaped, dimensioned, and positioned in the inlet duct to condition airflow through the inlet duct.

According to still further aspects of the present disclosure, a method is disclosed for operating a boundary layer ingestion propulsor in an aircraft comprising an elongated fuselage extending between a nose section and a tail section. The method comprises ingesting boundary layer air through an inlet duct of the propulsor, the inlet duct defined between a nacelle and the fuselage, the nacelle defining a leading edge line extending from a top dead center to a bottom dead center of the nacelle intersecting an axis of rotation of the propulsor at an angle no greater than seventy degrees; and rotating a fan of the propulsor, the fan receiving the ingested boundary layer air via the inlet duct.

In some embodiments the method further comprises conditioning the effluent of the propulsor by adjusting the position of one or more exit guide vanes positioned within the nacelle downstream of the fan. In some embodiments the step of rotating the fan further comprises providing power to the fan from an electric motor. In some embodiments the electric motor is positioned in a chamber defined by the nacelle, and wherein the electric motor provides power to the fan via a shaft and a gearbox. In some embodiments the method further comprises positioning the boundary layer ingestion propulsor in the tail section.

BRIEF DESCRIPTION OF THE DRAWINGS

The following will be apparent from elements of the figures, which are provided for illustrative purposes.

Figure 1:
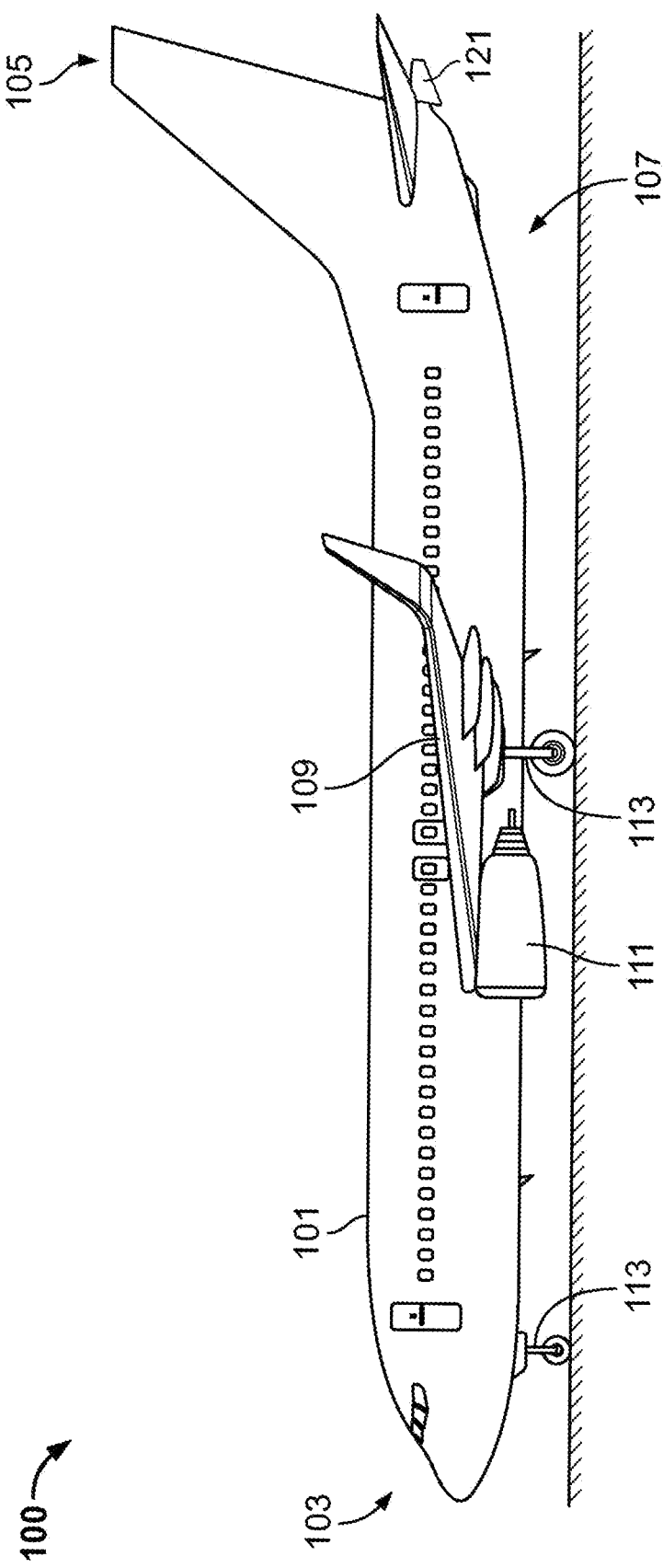
FIG. 1 is a side view of an aircraft in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

The mounting and positioning of a boundary layer ingestion propulsor must consider a number of factors. First, the propulsor and any surrounding structures such as a nacelle must be designed within a standard tail strike envelope of an aircraft. For a propulsor mounted to a tail section of an aircraft, this requires careful consideration of the shape and dimensions of the propulsor and nacelle to avoid violating the tail strike envelope. Second, the air inlet of the propulsor—as generally shaped by the aircraft fuselage and the nacelle—must effectively and efficiently ingest boundary layer air, particularly along the upswept underside of the tail section of an aircraft.

The present disclosure is therefore directed to an aircraft, aircraft fuselage, and/or boundary layer ingestion propulsor to overcome the aforementioned challenges. More specifically, the present disclosure is directed to a boundary layer ingestion propulsor having an elongated lower air inlet as compared to prior art aft-mounted propulsors. The elongated inlet allows for a more effective intake of boundary layer air, and also provides a propulsor and nacelle solution within the tail strike envelope. The present disclosure is additionally directed to methods of operating a boundary layer ingestion propulsor.

FIG. 1 is a side profile view of an aircraft 100 having a boundary layer ingestion propulsor 121. The aircraft comprises an elongated fuselage 101 extending between a nose section 103 and a tail section 105. The elongated fuselage 101 has an upswept underside 107 in the tail section 105. The aircraft further comprises a wing 109 extending from each side of the fuselage 101 and a gas turbine engine 111 mounted beneath each wing 109. With the underwing mount shown in FIG. 1, the gas turbine engine 111 is a free stream ingesting engine. The aircraft 100 may further comprise landing gear 113. The propulsor 121 is positioned in the tail section 105 of the aircraft 100.

Figure 2:
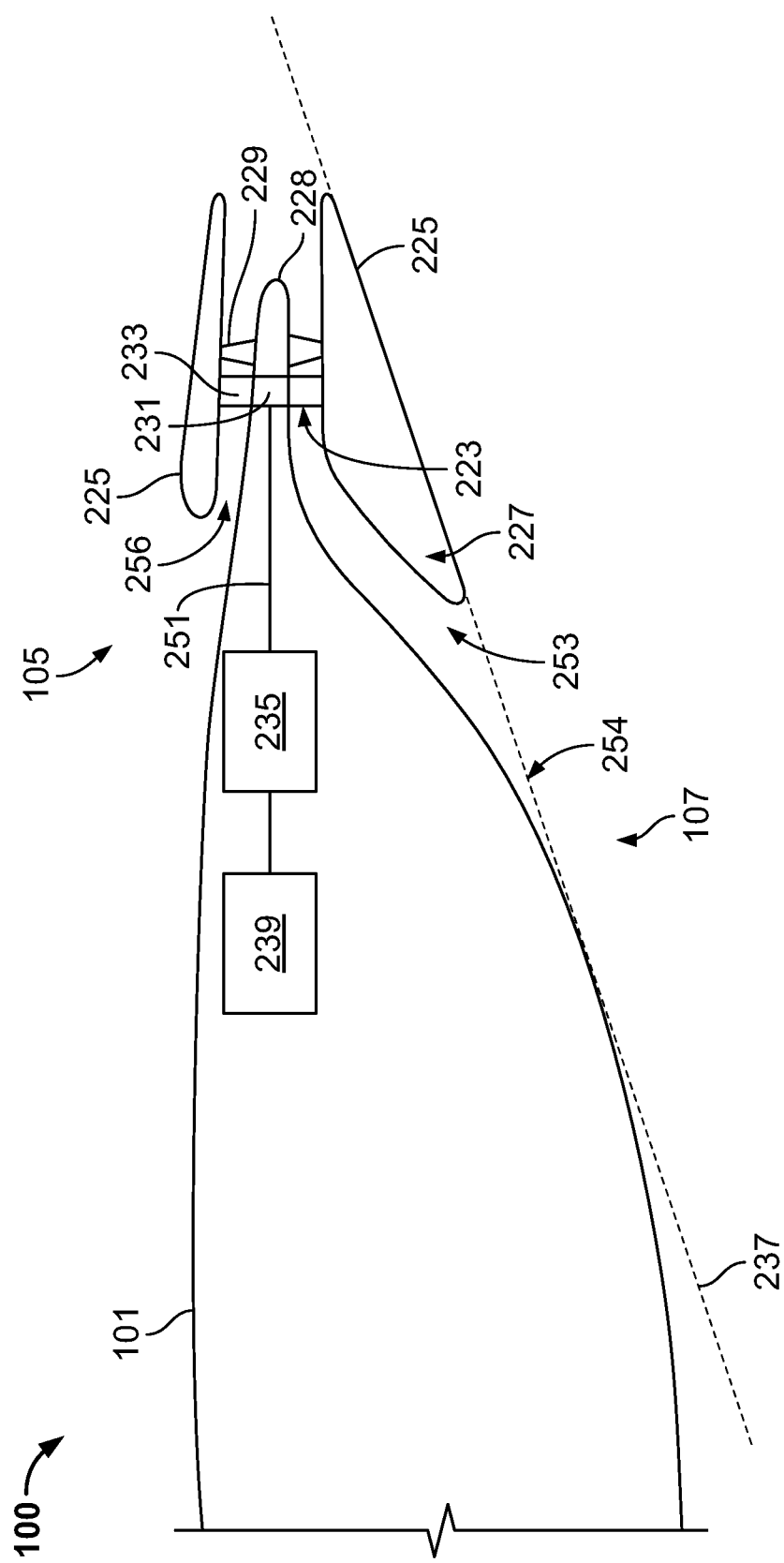
FIG. 2 is a schematic and cross sectional view of the tail section of an aircraft having a boundary layer ingestion propulsor in accordance with some embodiments of the present disclosure.
Figure 3A:
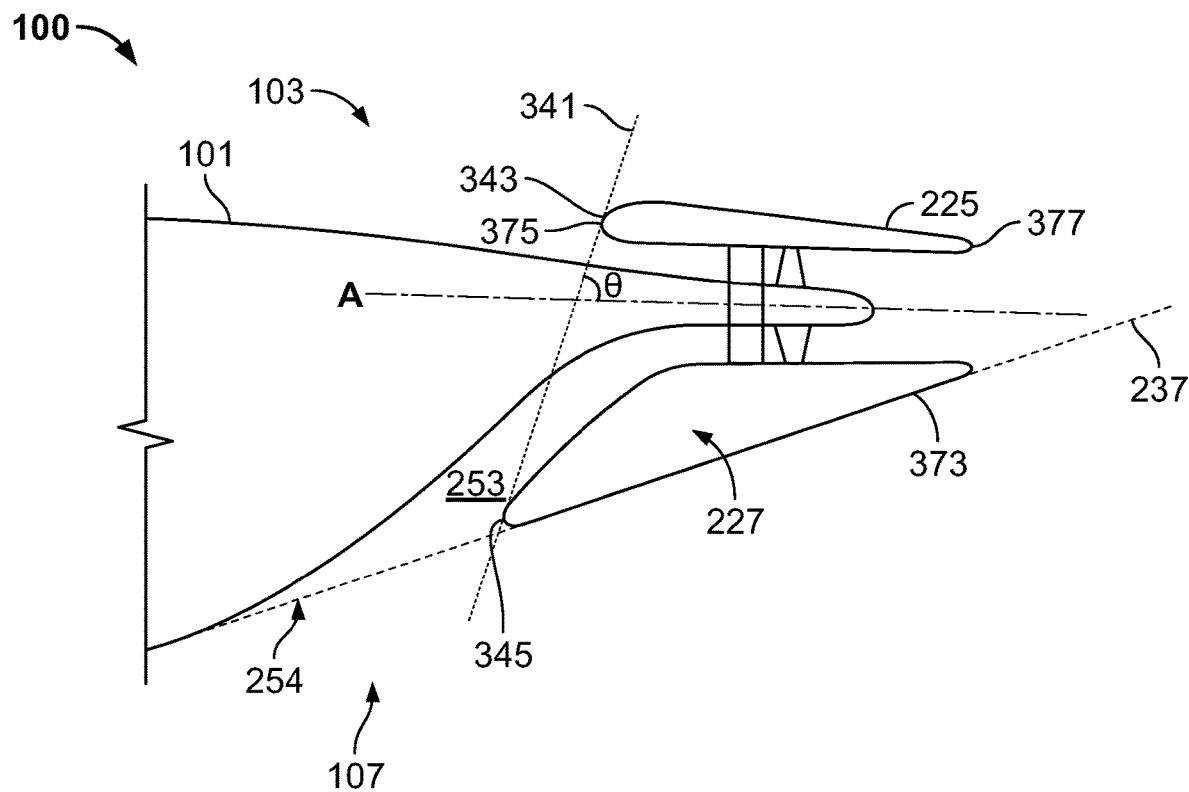
FIG. 3A is a detailed schematic and cross sectional view of the tail section of an aircraft having a boundary layer ingestion propulsor in accordance with some embodiments of the present disclosure.
Figure 3B:
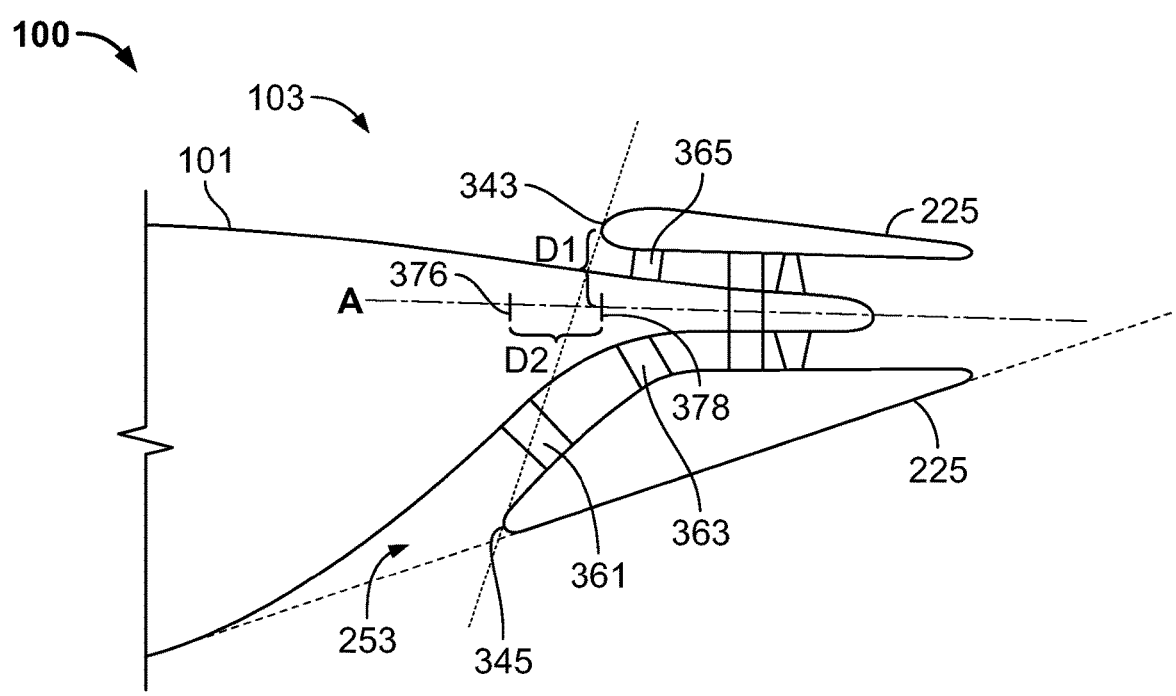
FIG. 3B is a detailed schematic and cross sectional view of the tail section of an aircraft having a boundary layer ingestion propulsor in accordance with some embodiments of the present disclosure.
Figure 4:
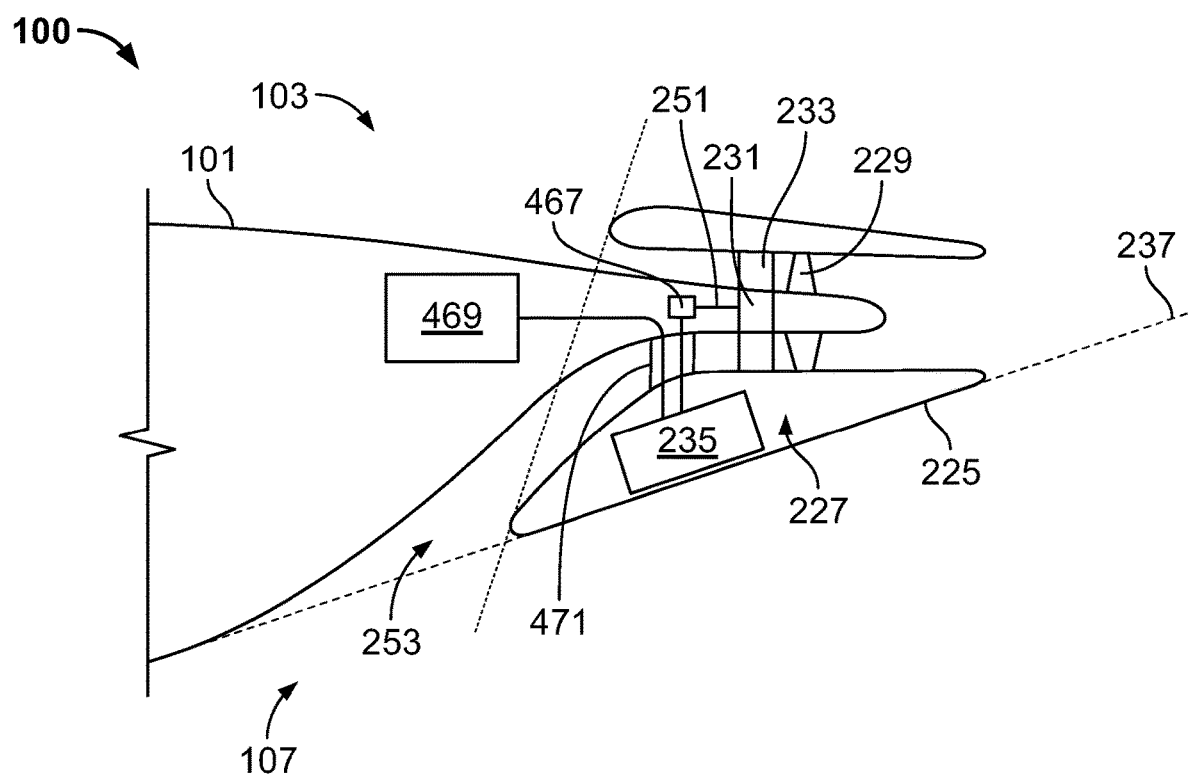
FIG. 4 is a detailed schematic and cross sectional view of the tail section of an aircraft having a boundary layer ingestion propulsor in accordance with some embodiments of the present disclosure.

FIG. 2 is a schematic and cross sectional view of the tail section 105 of an aircraft 100 having a boundary layer ingestions propulsor 121 in the tail section 105. FIGS. 3A and 3B provide detailed views of the aircraft 100 of FIG. 2.

The propulsor 121 may comprise a fan 223 radially encased by a nacelle 225. The nacelle 225 may circumscribe the fuselage 101. The fan 223 may comprise a rotor 231 and a plurality of blades 233 extending from the rotor 231. The fan 223 may define an axis of rotation A of the propulsor.

In some embodiments, the fan 223 may be an electric fan powered by an electric motor 235. The electric motor 235 may drive the fan 223 via a shaft 251. As shown schematically in FIG. 2, the electric motor 235 may be positioned within the fuselage 101. The electric motor 235 may be controlled by a suite of power electronics 239. The electric motor 235 may receive electric power from a power source such as an engine, a battery, or a fuel cell. The electric motor 235 may receive electric power from a gas turbine engine 111. In other embodiments, the fan 223 may be powered directly by an engine such as gas turbine engine 111 via linkages and shafts.

In some embodiments the propulsor 121 may further comprise one or more exit guide vanes 229 positioned in the nacelle 225 downstream of the fan 223. The one or more exit guide vanes 229 may be static or dynamic guide vanes. The exit guide vanes 229 may condition the effluent of the fan 223, for example by translating dynamic and swirling flow into increased axial thrust. The propulsor 121 may further comprise a tail cone 228.

An inlet duct 253 is defined between the nacelle 225 and tail section 105 of the fuselage 101. To improve boundary layer ingestions, the inlet duct 253 is an elongate duct having an inlet 254 at the upswept underside 107 farther forward along the fuselage 101 than seen in the prior art. The inlet duct 253 may be substantially asymmetric between a top half and a bottom half of the inlet duct 253. Achieving an elongate inlet duct 253 and forward-positioned inlet 254 requires a unique shape of the nacelle 225.

As seen in the cross sections of FIGS. 3A and 3B, the nacelle 225 comprises an annular member 373 extending axially along the axis of rotation A from a leading edge 375 to a trailing edge 377. The leading edge 375 may extend a full 360 degrees about the axis of rotation A, or may be divided into multiple segments.

Along the leading edge 375 the nacelle 225 defines a top dead center 343 and a bottom dead center 345. In an axial dimension (i.e along the axis of rotation A), the bottom dead center 345 is forward of the top dead center 343. The disclosed nacelle 225 transitions from a fully embedded inlet 254 at bottom dead center 345 to a scoop inlet 256 at top dead center 343.

A leading edge line 341 may extend from top dead center 343 to bottom dead center 345 and may intersect the axis of rotation A at an angle θ of not greater than seventy degrees. In some embodiments, the leading edge line 341 intersects the axis of rotation A at an angle θ of not greater than sixty degrees.

In some embodiments, a first distance D1 is defined as the shortest distance from top dead center 343 to the axis of rotation A. The first distance D1 is typically measured perpendicular and/or normal to the axis of rotation A. A second distance D2 defined as the axial distance between a first point 376 on the axis of rotation A and a second point 378 on the axis of rotation A. The first point 376 is the axial position of the bottom dead center 345 on the axis of rotation A, or where a plane normal to the axis of rotation A intersects bottom dead center 345 along the axis of rotation A. The second point 378 is the axial position of the top dead center 343 on the axis of rotation A, or where a plane normal to the axis of rotation A intersects the top dead center 343 along the axis of rotation A.

In some embodiments, the second distance D2 is greater than the first distance D1. The bottom dead center 345 is positioned forward of the top dead center 343 along the axis of rotation A at an axial distance greater than the shortest distance between top dead center 343 and the axis of rotation A. In some embodiments, the second distance D2 is 120% of the first distance D1. The bottom dead center 345 is positioned forward of the top dead center 343 along the axis of rotation A at an axial distance greater than 120% of the shortest distance between top dead center 343 and the axis of rotation A.

In some embodiments, a tail strike limit 237 or tail strike envelope may comprise a line or plane intersecting at least a portion of the upswept underside 107 of the tail section 105. The tail strike limit 237 may be tangential to the upswept underside 107. The tail strike limit 107 may be defined by the fuselage. The tail strike limit 237 may be defined by regulations of the Federal Aviation Administration or European Aviation Safety Agency. The disclosed nacelle 225 is positioned fully within the tail strike limit 237.

In some embodiments, the propulsor 121 further comprises one or more inlet members positioned in the inlet duct 253. As illustrated in FIG. 3B, a bottom half of the inlet duct 253 may include a first inlet member 361 and a second inlet member 363. The top half of the inlet duct 253 may include a third inlet member 365. The inlet members 361, 363, 365 may be shaped as airfoils. In some embodiments, one or more of the inlet members 361, 363, 365 may be struts and may provide structural support to the nacelle 225. The struts may connect the nacelle 225 and/or portions of the inlet duct 253 to the fuselage 101. The struts may be provided in a sufficient number, size, strength, and positioning in order to overcome various loadings and stresses on the nacelle 225 and/or fuselage 101, such as aero drag, vibration, maneuvers including g-force maneuvers, hard landings, and tail strikes.

The inlet members 361, 363, 365 may also be inlet guide vanes, and may be positioned, shaped, and dimensioned to improve the aerodynamics of air flow through the inlet duct 253. The inlet members 361, 363, 365 may improve uniformity of air flow distribution through the inlet duct 253.

In some embodiments one or more of the inlet members 361, 363, 365 shown in FIG. 3B may be a set of inlet members positioned about a circumference of the inlet duct 253. The set of inlet members may be uniformly or non-uniformly distributed about the circumference. For example, in some embodiments a total of between 12 and 24 inlet members are positioned in the inlet duct 253. In some embodiments a total of between six and ten inlet members are struts positioned in the inlet duct 253. These inlet members may be uniformly or non-uniformly distributed in an axial, radial, or circumferential dimension.

In some embodiments an inlet member may be positioned in the inlet duct 253 at top dead center 343, another inlet member may be positioned at the 3 o'clock position, and another inlet member may be positioned at the 9 o'clock position.

In some embodiments a plurality of inlet members may be positioned in the inlet duct 253 to condition air flow through the inlet duct 253. For example, a portion of the inlet members may be struts that provide structural support, while a portion of the inlet members may be non-structural airfoils and/or inlet guide vanes. The inlet members may be positioned along the axial length of the inlet duct 254 at uniform or non-uniform intervals, and similarly may be positioned about a circumference of the inlet duct 253 at uniform or non-uniform intervals. The inlet members may be shaped, dimensioned, and positioned to improve uniformity of airflow through the inlet duct 253. In some embodiments the inlet members may be shaped, dimensioned, and positioned to product swirl in the airflow through the inlet duct 253.

In some embodiments the nacelle 225 may define a chamber 227. The chamber 227 may be annular, or may be limited to the bottom half of the nacelle 225. The chamber 227 may be used to house various components of the aircraft 100 and/or propulsor. For example, in some embodiments the electric motor 235 may be positioned in the chamber 227. The electric motor 235 may be coupled to the fan rotor 231 via a shaft 251 and a gearbox 467. An electric generator 469, gas turbine engine 111, or similar device may provide electrical power to the electric motor 235. In some embodiments the electric generator 469 may also be positioned in the chamber 227 of the nacelle 225. In some embodiments the suite of power electronics 239 may be positioned in the chamber 227.

Figure 5:
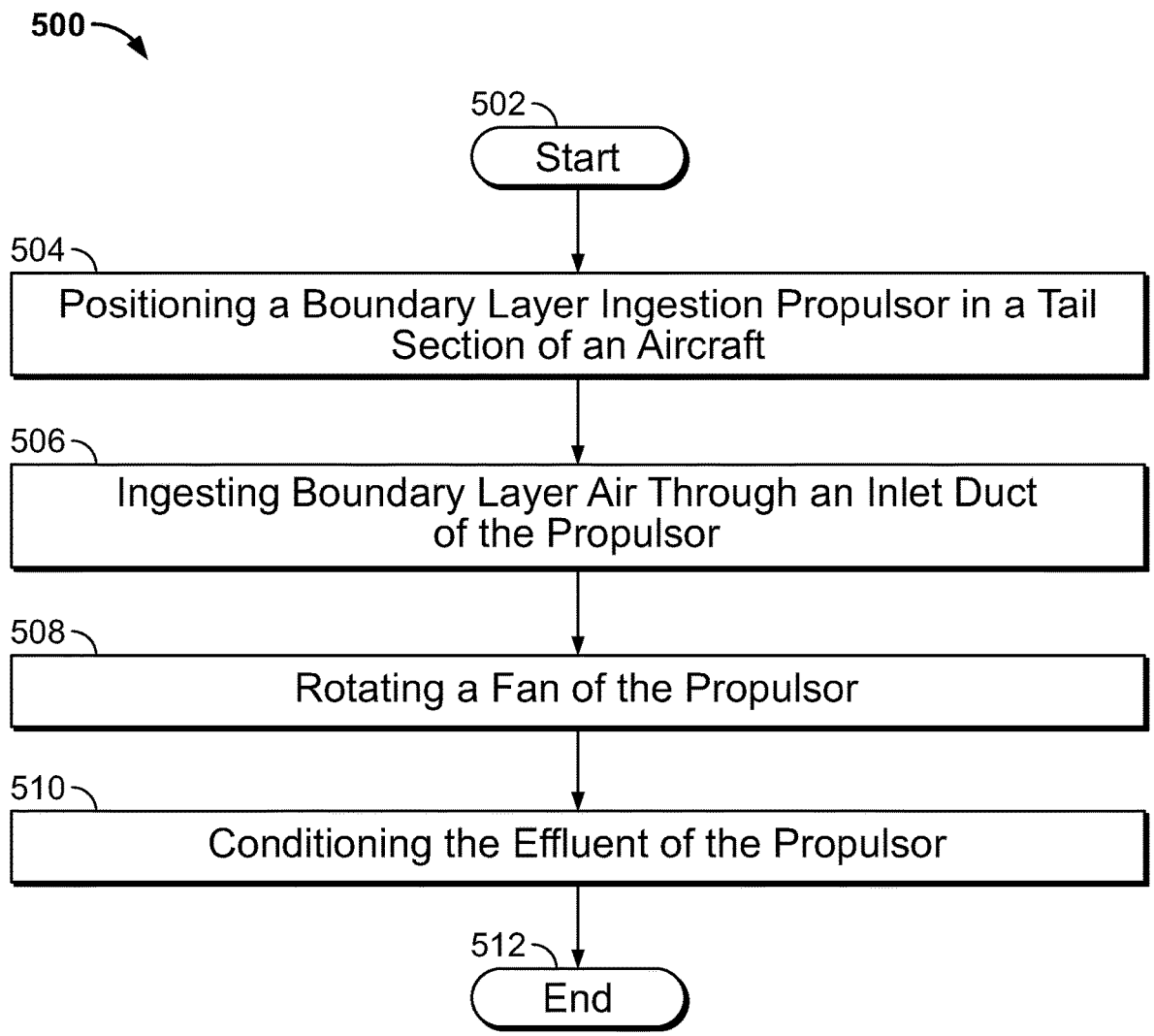
FIG. 5 is a flow diagram of a method in accordance with some embodiments of the present disclosure.

The present disclosure is additionally directed to methods of operating a boundary layer ingestion propulsor 121 in an aircraft 100. One such method 500 is presented in the flow diagram of FIG. 5. Method 500 starts at Block 502. The steps of method 500, presented at Blocks 502 through 512, may be performed in the order presented in FIG. 5 or in another order. One or more steps of the method 500 may not be performed.

At Block 504 a boundary layer ingestion propulsor 121 may be positioned in a tail section 105 of an aircraft 100. The propulsor 121 may comprise a fan 223 radially encased by a nacelle 225. The nacelle 225 may circumscribe the fuselage 101. The fan 223 may comprise a rotor 231 and a plurality of blades 233 extending from the rotor 231. The fan 223 may define an axis of rotation A of the propulsor.

At Block 506 boundary layer air may be ingested through an inlet duct 253 of the propulsor 121. The inlet duct may be defined between the nacelle 225 and tail section 105 of the fuselage 101. The nacelle 225 may comprise an annular member 373 extending axially along the axis of rotation A from a leading edge 375 to a trailing edge 377. A leading edge line 341 may extend from top dead center 343 to bottom dead center 345 of the nacelle 225 and may intersect the axis of rotation A at an angle θ of not greater than seventy degrees. In some embodiments, the leading edge line 341 intersects the axis of rotation A at an angle θ of not greater than sixty degrees.

At Block 508, a fan 223 of the propulsor 121 may be rotated. The fan 223 may receive boundary layer air ingested via the inlet duct 253. The fan 223 may be rotated by an electric motor 235. The electric motor 235 may be coupled to the fan 223 via a shaft 251. An electric generator 469, gas turbine engine 111, or similar device may provide electrical power to the electric motor 235. In some embodiments the nacelle 225 may define a chamber 227, and the electric motor 235 and/or electric generator 469 may be positioned in the chamber. The electric motor 235 may be coupled to the fan 223 by a shaft 251 and gearbox 467.

At Block 510, the effluent of the fan 223 of the propulsor 121 may be conditioned by adjusting the position of one or more exit guide vanes 229. The exit guide vanes 229 may be positioned in the nacelle 225, downstream of the fan 223.

Method 500 ends at Block 512.

The disclosed aircraft, boundary layer ingestion propulsor, and nacelle provide advantages over the prior art. By elongating the inlet duct of the propulsor and providing the inlet of the inlet duct further forward than seen in the prior art, the presently disclosed systems improve the effectiveness of boundary layer air ingestion. In particular, the disclosed inlet duct structure is effective to ingest boundary layer air from the thickest region of boundary layer air, namely along the upswept underside of the tail section of an aircraft. By transitioning from an embedded inlet at bottom dead center to a scoop inlet at top dead center, the disclosed nacelle and inlet duct also improves the mass flow rate of air entering the propulsor by providing a more even flow distribution about the circumference of the propulsor.

The disclosed propulsor and nacelle are also positioned fully within a tail strike limit or envelope of the aircraft. Further, the disclosed nacelle may define a chamber that houses various components, including the electric motor that drives the fan of the propulsor.

Although examples are illustrated and described herein, embodiments are nevertheless not limited to the details shown, since various modifications and structural changes may be made therein by those of ordinary skill within the scope and range of equivalents of the claims.

What is claimed is:

1. An aircraft comprising:
    an elongated fuselage extending between a nose section and a tail section thereof, said fuselage having an upswept underside in said tail section; and
    a boundary layer ingestion propulsor positioned in said tail section, said propulsor comprising a fan radially encased by a nacelle circumscribing the elongated fuselage, said nacelle defining a leading edge line extending from a top dead center to a bottom dead center of said nacelle intersecting an axis of rotation of said fan at an angle no greater than seventy degrees
    wherein said bottom dead center is positioned forward of said top dead center along the axis of rotation at an axial distance greater than a shortest distance from said top dead center to said axis of rotation.

2. The aircraft of claim 1 wherein said leading edge line intersects said axis of rotation at an angle of no greater than sixty degrees.

3. The aircraft of claim 1 further comprising:
    a gas turbine engine mounted to said aircraft; and
    an electric motor driven by the gas turbine engine, wherein said propulsor is an electric fan powered by the electric motor.

4. The aircraft of claim 3 wherein said nacelle defines a chamber, and wherein said electric motor is positioned in the chamber.

5. The aircraft of claim 4 wherein said electric motor is coupled to said propulsor via a shaft and a gearbox.

6. The aircraft of claim 1 wherein a leading edge of the nacelle extends 360 degrees about the axis of rotation and intersects said top dead center and said bottom dead center.

7. The aircraft of claim 1 wherein a tail strike limit of the aircraft is defined as a plane tangential to the upswept underside of the tail section, and wherein the nacelle is positioned entirely within said tail strike limit.

8. An aircraft comprising:
    an elongated fuselage extending between a nose section and a tail section thereof, said fuselage having an upswept underside in said tail section; and
    a boundary layer ingestion propulsor positioned in said tail section, said propulsor comprising a fan radially encased by a nacelle circumscribing the fuselage, said fan defining an axis of rotation and said nacelle defining a leading edge line extending from a top dead center to a bottom dead center of said nacelle;
    wherein said bottom dead center is positioned forward of said top dead center along the axis of rotation at an axial distance greater than a shortest distance from said top dead center to said axis of rotation.

9. The aircraft of claim 8 wherein said bottom dead center is positioned forward of said top dead center along the axis of rotation at an axial distance greater than 120% of the shortest distance from said top dead center to said axis of rotation.

10. The aircraft of claim 8 wherein an inlet duct is formed between the nacelle and the fuselage, said inlet duct being substantially asymmetrical between a top half and a bottom half of the inlet duct.

11. The aircraft of claim 10 further comprising a pair of struts positioned in said bottom half of the inlet duct.

12. The aircraft of claim 10 further comprising a plurality of inlet members positioned about a circumference of said inlet duct.

13. The aircraft of claim 12 wherein a portion of said plurality of inlet members are struts.

14. The aircraft of claim 12 wherein one or more of said plurality of inlet members is shaped, dimensioned, and positioned in said inlet duct to condition airflow through the inlet duct.

15. A method of operating a boundary layer ingestion propulsor in an aircraft comprising an elongated fuselage extending between a nose section and a tail section, said method comprising:
    positioning said boundary layer ingestion propulsor in said tail section, wherein said elongated fuselage has an upswept underside in said tail section;
    ingesting boundary layer air through an inlet duct of the propulsor, said inlet duct defined between a nacelle and said fuselage, said nacelle circumscribing the elongate fuselage and defining a leading edge line extending from a top dead center to a bottom dead center of said nacelle intersecting an axis of rotation of the propulsor at an angle no greater than seventy degrees, wherein said bottom dead center is positioned forward of said top dead center along the axis of rotation at an axial distance greater than a shortest distance from said top dead center to said axis of rotation; and
    rotating a fan of the propulsor, said fan receiving the ingested boundary layer air via the inlet duct, and said fan being radially encased by the nacelle.

16. The method of claim 15 further comprising:
    conditioning the effluent of the propulsor by adjusting the position of one or more exit guide vanes positioned within the nacelle downstream of said fan.

17. The method of claim 15 wherein the step of rotating the fan further comprises providing power to the fan from an electric motor.

18. The method of claim 17 wherein said electric motor is positioned in a chamber defined by the nacelle, and wherein said electric motor provides power to the fan via a shaft and a gearbox.

* * * * *